United States Patent

Kinzelmann et al.

[11] Patent Number: 5,827,393
[45] Date of Patent: Oct. 27, 1998

[54] HOTMELT ADHESIVE

[75] Inventors: Hans-Georg Kinzelmann, Pulheim; Regina Biele, Langenfeld, both of Germany

[73] Assignee: Henkel Kommanditgesellschaft auf Aktien, Duesseldorf, Germany

[21] Appl. No.: 119,134

[22] PCT Filed: Mar. 12, 1992

[86] PCT No.: PCT/EP92/00546

§ 371 Date: Sep. 20, 1993

§ 102(e) Date: Sep. 20, 1993

[87] PCT Pub. No.: WO92/16592

PCT Pub. Date: Oct. 1, 1992

[30] Foreign Application Priority Data

Mar. 20, 1991 [DE] Germany .......................... 41 09 104.3
Oct. 30, 1991 [DE] Germany .......................... 41 35 730.2

[51] Int. Cl.⁶ .......................... B32B 31/20; C08J 123/08; C08J 175/04; C08J 167/02
[52] U.S. Cl. .................................... 156/308.2; 156/331.8; 156/332
[58] Field of Search ................................. 524/270, 297, 524/272; 528/65, 67; 156/308.2, 331.8, 332

[56] References Cited

U.S. PATENT DOCUMENTS

| | | | |
|---|---|---|---|
| 3,629,360 | 12/1971 | Burkhart et al. | 156/332 |
| 3,832,314 | 8/1974 | Hoh et al. | 156/332 |
| 3,896,069 | 7/1975 | Kosaka et al. | 524/68 |
| 3,931,077 | 1/1976 | Uchigaki et al. | 524/270 |
| 3,991,025 | 11/1976 | Kutch et al. | 524/272 |
| 4,613,632 | 9/1986 | Aliani et al. | 524/270 |
| 4,618,651 | 10/1986 | Gilch et al. | 524/270 |
| 5,284,891 | 2/1994 | Wouters | 524/522 |
| 5,455,293 | 10/1995 | Wood et al. | 524/272 |
| 5,518,571 | 5/1996 | Puerkner et al. | 156/332 |

FOREIGN PATENT DOCUMENTS

| | | |
|---|---|---|
| 0420246 | 4/1991 | European Pat. Off. . |
| 3236313 | 4/1984 | Germany . |
| 2234516 | 2/1991 | United Kingdom . |

*Primary Examiner*—Peter A. Szekely
*Attorney, Agent, or Firm*—Ernest G. Szoke; Wayne C. Jaeschke; Daniel S. Ortiz

[57] ABSTRACT

Hot melt adhesives having an "open time" of 10 minutes or longer, preferably more than 1 hour and, more preferably, more than 2 hours for a contact pressure of 5 kg/cm² and atmospheric conditions of 25° C./26% relative air humidity are provided. Immediately after the parts to be joined have been pressed together at 18° to 23° C., strengths (initial strengths) of 1 MPa and more and preferably more than 1.5 MPa are obtained. The hot melt adhesive is comprised of 1) a polyester, polyamide, polyethylene/vinyl acetate, or NCO-terminated polyurethane prepolymer which does not crystallize during the open time and 2) a tackifier and/or a plasticizer.

18 Claims, No Drawings

HOTMELT ADHESIVE

BACKGROUND OF THE INVENTION

1. Field of the Invention

This invention relates to a hotmelt adhesive, to its use, to a bonding process and to parts by joined coated with the hotmelt adhesive.

2. Discussion of Related Art

A hotmelt adhesive is a one-component, water-free, solventless adhesive which is solid at room temperature, which is applied as a melt for bonding and which establishes the bond by solidifying on cooling. The parts to be joined are normally fitted together immediately and, at the most, a few minutes after application of the adhesive melt. However, they can only be coated in the first instance and then stored for more or less long periods before, finally, the adhesive is activated by heating to the application temperature. Since the hotmelt adhesive has to be melted not only for application, but also for bonding the parts to be joined, its handling involves disadvantages. Bonds of large surface area involving small amounts of adhesive and long waiting times before the parts are fitted together are not possible without additional heating.

There are also pressure-sensitive adhesives which are applied from the melt. The adhesives in question are adhesives which are permanently tacky at room temperature and which adhere immediately to almost all substrates under light pressure. Although they can also be used for establishing bonds of large surface area after relatively long waiting times, the strengths of the resulting bonds are very poor. Accordingly, they are mainly used when subsequent separation is required as is the case, for example, with adhesive plasters, labels, adhesive tapes, etc. To avoid unwanted bonding, the tacky surfaces have to be covered with a silicone paper.

Hotmelt adhesives of this type are known, for example, from the "Technische Information" brochure of Tivoli-Werke AG, Hamburg. The product TIVOMELT 9617/11 is known from the "Technische Information" of March, 1986 relating to the reactive hotmelts TIVOMELT 9600 and TIVOMELT 9617. The reactive hotmelt in question is a polyurethane (PUR) prepolymer hotmelt adhesive which reacts with moisture. The product has a particularly long open time in which bonding can be carried out. Immediately after application, it has adhesive properties. This means that the materials to be joined have to be fixed during the setting phase. After an initial phase of about 10 minutes, a rapid increase in strength occurs through crystallization. The accompanying reaction with moisture is over after 2 to 7 days, depending on the ambient temperature and humidity level. The product TIVOMELT 9617/76 has a much higher initial strength and forms a distinctly harder film. The setting rate bears a certain similarity to that of conventional hotmelts.

DE-A1-32 36 313 describes a hotmelt adhesive of the following constituents: prepolymeric isocyanate, thermoplastic polyurethane and a low molecular weight synthetic resin. 10 Seconds after its application from the melt, the part to be joined is applied and pressed on (see Application Example 1).

Japanese patent JP 61 115 977 describes a hotmelt adhesive of the following constituents: aromatic oil, an NCO-functional urethane prepolymer, a tackifier, for example a coumarone resin, a coumarone/indene resin, a terpene/phenol resin, a styrene resin or a terpene resin.

The problem addressed by the present invention was to improve the handling properties of hotmelt adhesives with only a negligible effect, if any, on their strength properties.

DESCRIPTION OF THE INVENTION

The solution provided by the invention is defined in the claims. It is based essentially on the observation that certain hotmelt adhesives can set in the same way as contact adhesives. Consistent with the general definition, the hotmelt adhesive according to the invention is solid at room temperature and hardly anything adheres to it in the absence of pressure. It is free from water and volatile solvents.

The expression "open time" is understood to be the time in which bonding can be carried out under pressure. It is of the order of 10 minutes or longer, preferably more than 1 hour and, more preferably, more than 2 hours for a contact pressure of 5 kg/cm$^2$ and atmospheric conditions of 25° C./26% relative air humidity. Immediately after the parts to be joined have been pressed together at 18° to 23° C., for 30 seconds, strengths (initial strengths) of 1 MPa and more and preferably more than 1.5 MPa are obtained.

After application to the parts to be joined, followed by cooling to room temperature over a period of 10 minutes, the hotmelt adhesive according to the invention has a Shore A hardness of less than 65 and, more particularly, in the range from 10 to 55. Its glass transition temperature is preferably between −10 and +30° C. and, more particularly, between 10° and 25° C.

In the order to obtain an optimal film hardness and glass transition temperature, the hotmelt adhesive—in one particular embodiment—should contain the following components in % by weight, based on the hotmelt adhesive:

1. 30 to 95% by weight polymer, such as polyester, polyamide, polyethylene/vinyl acetate, which does not crystallize during the open time.
2. A tackifier softening at 10° to 150° C., preferably a resin having a softening range of 50° to 150° C. The tackifier is added in a quantity of 0 to 50% by weight and preferably in a quantity of 20 to 50% by weight, based on the adhesive as a whole.
3. A plasticizer may optionally be added to the adhesive (instead of or preferably together with the tackifier) in a quantity of up to 30% and preferably in a quantity of 5 to 25% by weight, based on the hotmelt adhesive as a whole.

Another preferred embodiment contains the following components:

1. An NCO-terminated polyester polyurethane prepolymer which does not crystallize during the open time. It should have a number average molecular weight $M_n$ of 2,000 to 10,000 g/mol. A polyester diol is preferably used as the diol component of the polyurethane.
2. A tackifier having a softening range of 40° to 150° C. Phenol-modified coumarone/indene resins having a softening range of 55° to 105° C. are preferred. The tackifier is added in a quantity of 1 to 50% by weight and preferably in a quantity of 5 to 30% by weight, based on the adhesive as a whole.
3. A plasticizer may optionally be added to the adhesive in a quantity of up to 25% and preferably in a quantity of 1 to 10%, based on the hotmelt adhesive as a whole.

The crystallization of the polymer is reflected in the clouding of the initially transparent adhesive film.

To produce the hotmelt adhesive according to the invention, the components are melted together and intensively mixed, for example at 180° to 200° C.

The adhesive according to the invention may be used in the usual way, i.e. the parts to be joined are pressed together immediately after application of the melt. However, the hotmelt adhesive is preferably applied as a melt to the surface of both parts and is then cooled to room temperature over a period of about 10 minutes. For bonding, the parts to be joined are pressed together without heating after more than 10 minutes. In other words, the hotmelt adhesive according to the invention may be treated in the same way as a contact adhesive applied from the melt. Accordingly, the hotmelt adhesive has the advantageous properties of a hotmelt adhesive and those of a contact adhesive. The disadvantages of a contact adhesive, for example the emission of organic solvents or the long airing time in the case of water-based systems, accompanied by generally poor heat resistance values, are avoided.

The invention is illustrated by the following Examples which are based on the following tests:

Shore A film hardness according to DIN 53505 on at least 6 mm thick films.

Tensile shear strength (TSS) on beechwood test specimens (80×50×4 mm) overlapping on one side.
The adhesive was applied by coating knife at 180° to 200° C. in thicknesses of 100 μm (Example A) and 250 μm (Example B). It was then allowed to cool by storage at room temperature for 10 minutes. The waiting time before pressing began immediately after cooling of the coated test specimens.

Contact pressure 5 kg/cm²
Overlap area 1,000 mm²
Test speed 100 mm/min.

Testing was carried out immediately after pressing (=TSS immediate) in Example Aa) and the indicated number of days afterwards (=$TSS_d$) in Example Ab) and a few minutes after pressing (=TSS initial) in Example B.

The glass transition temperature ($T_g$) of the uncrosslinked coating composition was determined by dynamic/mechanical/thermal analysis. The $T_g$ is defined as the maximum of tan δ at frequency of 1 Hz and at a heating rate of 2° C./minute.

EXAMPLE A

Aa) Production of the adhesives

The starting materials listed in Table 1 were melted together at 180° to 200° C. and intensively mixed. In Examples 1 to 5, crystallization is clearly reflected in the very distinct clouding.

Ab) Application

Beechwood test specimens were bonded with the hotmelt adhesive obtained, as described in the test methods. Hardness, initial strength and $T_g$ were all determined as a function of the open time. The results are set out in Tables 1 and 2.

TABLE 1

| | Adhesive composition | | | | | | Open time | Properties | | | |
|---|---|---|---|---|---|---|---|---|---|---|---|
| | Polymer | | Resin | | Plasticizer | | Pressed | Film | TSS | | |
| Ex. | Type | % by weight | Type | % by weight | Type | % by weight | after [mins.] | hardness [Shore A] | immediate [MPa] | $TSS_d$ [MPa] | Tg [°C.] |
| 1 | Dynapol S 1229[1] | 75 | CI B1/75A | 20 | DOP[7] | 5 | 10 | 14 | 1.5 | 5 | 19 |
| 2 | Dynapol S 1229[1] | 75 | Synthetic Resin AP[5] | 20 | " | 5 | 10 | 27 | 1.4 | n.d. | 11 |
| | | | | | | | 30 | 53 | 2.3 | " | |
| 3 | Dynapol S 1229[1] | 75 | Staybelite Ester 10[6] | 20 | " | 5 | 10 | 11 | 2.6 | n.d. | 16 |
| | | | | | | | 30 | 18 | 1.6 | " | |
| 4 | Dynapol S 1229[1] | 75 | CI B1/55A[4] | 20 | " | 5 | 10 | 20 | 1.8 | 5₁ | 16 |
| 5 | Dynapol S 1229[1] | 75 | CI B1/105A[4] | 20 | " | 5 | 10 | 30 | 2.3 | 6₁ | 25 |

TABLE 2

| | Adhesive composition | | | | | | Open time | Properties | | | |
|---|---|---|---|---|---|---|---|---|---|---|---|
| | Polymer | | Resin | | Plasticizer | | Pressed | Film | TSS | | |
| Ex. | Type | % by weight | Type | % by weight | Type | % by weight | after [mins.] | hardness [Shore A] | immediate [MPa] | $TSS_d$ [MPa] | Tg [°C.] |
| C1 | Dynapol S 1229 | 100 | | 0 | | 0 | 10 | | Cannot be pressed | | 11 |
| 6 | Macromelt 6239[2] | 80 | | 0 | Ketenflex[8] | 20 | 10 | 43 | 2.0 | 3.1₃ | −3 |
| C2 | Macromelt 6239[2] | 100 | | 0 | | 0 | 10 | 74 | Cannot be pressed | | 11 |
| 7 | Escorene UL 15019 | 50 | Staybelite Ester 10[6] | 50 | | 0 | 10 | 53 | 1.0 | 1.5₅ | 20 |
| | | | | | | | 30 | 59 | 1.0 | 1.5₅ | |
| | | | | | | | 60 | 59 | 1.8 | 2.1₅ | |
| C3 | Escorene UL 15019 | 100 | | 0 | | 0 | 10 | 86 | Cannot be pressed | | −16 |

TABLE 2-continued

| | Adhesive composition | | | | | | Open time | Properties | | | |
|---|---|---|---|---|---|---|---|---|---|---|---|
| | Polymer | | Resin | | Plasticizer | | Pressed | Film | TSS | | |
| Ex. | Type | % by weight | Type | % by weight | Type | % by weight | after [mins.] | hardness [Shore A] | immediate [MPa] | TSS$_d$ [MPa] | Tg [°C.] |
| 8 | Escorene UL 40028 | 50 | Staybelite Ester 10 | 50 | | 0 | 10 | 26 | 1.5 | n.d. | |
| | | | | | | | 30 | 29 | 1.8 | " | 13 |
| | | | | | | | 60 | 29 | 1.0 | " | |
| C4 | Escorene UL 40028 | 100 | | 0 | | 0 | 10 | 82 | Cannot be pressed | | −16 |

Legend:
[1] DYNAPOL S 1229 is a medium-crystalline, saturated, linear copolyester having a number average molecular weight $M_n$ of 12,200 (a product of Hüls AG).
[2] MACROMELT 6239 is a thermoplastic polyamide hotmelt (a product of Henkel KGaA).
[3] ESCORENE Ultra 15019 and 40028 CC are EVA copolymers for adhesives produced by Esso AG.
[4] CI B1/75A and 55A and also 105A are alcohol-soluble, phenol-modified indene/coumarone resins with softening points of 75, 55 and 105° C.
[5] The synthetic resin AP is a ketone/formaldehyde resin of Hüls AG for increasing gloss in NC and PVC lacquers.
[6] STAYBELITE Ester 10 is a triethylene glycol ester of hydrogenated colophony (a product of Hercules)
[7] DOP is the abbreviation for dioctyl phthalate.
[8] KETJENFLEX 8 is an N-ethylbenzene sulfonamide resin available from AKZO as a plasticizer for polyamides. n.d. = not determined.

The comparison Examples are identified by a C in the first column.

EXAMPLE B

Ba) Comparison Example

TIVOMELT 9617/76, a reactive polyester urethane containing resin (a product of Tivoli)

| Pressed After | Hardness Shore A | TSS INITIAL (MPA) | Comments |
|---|---|---|---|
| 10 mins | <10 | 1.0 | Incipient recrystallization |
| 30 mins | 30 | 0.5 | |
| 60 mins | 58 | Cannot be pressed | Recrystallized |

Bb) Production

The NCO-terminated polyester polyurathanes were synthesized in the melt in known manner from polyester diols with 2 to 2.2 equivalents diphenylmethane-4,4'-diisocyanate. The tackifier and plasticizer, if any, were added after the theoretical NCO content had been reached, followed by homogenization in the melt. For further particulars, see Table 3. Examples 2 and 4 correspond to the invention, Examples 1 and 3 are Comparison Examples.

Bc) Application

Beechwood test specimens were bonded with the hotmelt adhesive obtained in the same way as described in the test methods. Hardness, initial strength and $T_g$ were all determined as a function of the open time. The results are set out in Table 3. It is also pointed out that the tensile shear strength of all the test specimens of Example 4 was so high after 7 days that material failure occurred.

Determination of the open time of Example 2 on rigid PVC (dimensions and test conditions correspond to the wood test specimens). Storage at 25° C./26% relative humidity.

| Pressed after | Shore A | TSS Initial (MPa] |
|---|---|---|
| 10 mins. | 28 | 2.0 |
| 1 h | 28 | 1.9 |
| 3 h | 28 | 1.8 |
| 5 h | 29 | 1.3 |
| 22 h | 32 | 2.4 |

TSS after 7 days: material failure in all test specimens

TABLE 3

| Ex. | Polyester Portion of the NCO-Terminated Polyester Polyurethane (PUR) | | Resin [%] | | Plasticizer [%] | | Hardness Shore A | Pressed after [mins.] | TSS$_{initial}$ [MPa] | T$_g$ [°C.] |
|---|---|---|---|---|---|---|---|---|---|---|
| 1 | 100 | Dynacoll 7320[1),7)] | 0 | | 0 | | <10 | 10 | 0.8 | |
| | | | | | | | <10 | 30 | 0.5 | 5 |
| | | | | | | | 72 | 60 | c.b.p.[6)] | |
| 2 | 81 | Dyn. 7320[1),7)] | 15 | CI[4)] | 4 | DOP[5)] | 28 | 10 | 2.0 | |
| | | | | | | | 30 | 30 | 1.8 | 18 |
| | | | | | | | 32 | 60 | 1.9 | |
| 3 | 69 | DYN. 7320[1)] PE230[3)] Dynapol S1402[2)] 12:12:1[7)] | 31 | CI[4)] | 0 | | 61 | 10 | 0.7 | |
| | | | | | | | 65 | 30 | c.b.p.[6)] | 30 |
| | | | | | | | 66 | 60 | c.b.p.[6)] | |

TABLE 3-continued

| Ex. | Polyester Portion of the NCO-Terminated Polyester Polyurethane (PUR) | Resin [%] | | Plasticizer [%] | Hardness Shore A | Pressed after [mins.] | TSS$_{initial}$ [MPa] | T$_g$ [°C.] |
|---|---|---|---|---|---|---|---|---|
| 4 | 85 Dyn. 7320[1) PE230[3) | 15 | CI[4) | 0 | 36 36 | 10 30 | 2.5 2.2 | Not determined |
| | Dynapol 81402[2) 23:23:4[7) | | | | 38 | 60 | 2.2 | |

Legend:
[1)DYNACOLL 7320, a partly crystalline copolyester for the production of reactive adhesives with delayed setting (a product of Hüls AG).
[2)DYNAPOL S 1402, a saturated weakly crystalline copolyester (a product of Hüls AG)
[3)PE 230, a linear polyester of adipic acid, isophthalic acid and diethylene glycol (Henkel KGaA)
[4)Indene/coumarone resin B1/75-A, phenol-modified, alcohol-soluble, softening point (K.S.) 75° C. ± 5° C., a product of VfT GmbH
[5)DOP = dioctyl phthalate
[6)c.b.p. = cannot be pressed
[7)the polyester was reacted with from 2.0 to 2.2 equivalents of diphenylmethane-4,4'-diisocyanate

We claim:

1. A process of bonding parts having surfaces to be joined comprising applying a contact hotmelt adhesive as a melt to coat each surface to be joined permitting the applied contact hotmelt adhesive to solidify, fitting the coated surfaces together with pressure without heating wherein the contact hotmelt adhesive comprises:

a) 30% to 95% by weight of a polymer selected from the group consisting of polyesters, polyamides and polyethylene/vinyl acetate, and b) at least one member selected from the group consisting of a tackifier softening in a range of 10° C. to 150° C. present in an amount of up to 50% by weight and a plasticizer present in an amount of up to 30% by weight, the contact hotmelt adhesive composition having an open time of at least 10 minutes and wherein the polymer does not crystallize during the open time.

2. The process as claimed in claim 1 wherein said melt is cooled to room temperature over a period of 8 minutes after said applying and before said fitting.

3. The process of claim 1 wherein the tackifier in the contact hotmelt adhesive has a softening range of 50° C. to 150° C.

4. The method of claim 1 wherein the contact hotmelt adhesive has an initial strength of at least 1 MPa.

5. The process of claim 1 wherein the contact hotmelt adhesive has a Shore A hardness at room temperature below 65 and a glass transition temperature between −10° C. to +30° C.

6. The process of claim 5 wherein the contact hotmelt adhesive has a Shore A hardness at room temperature in the range of from 10 to 60 and a glass transition temperature in the range of from 10° C. to 25° C.

7. The process of claim 1 wherein the contact hotmelt adhesive contains from 20% to 50% of the tackifier, based on the contact hotmelt adhesive as a whole.

8. The process of claim 1 wherein the contact hotmelt adhesive contains from 5% to 25% plasticizer, based on the contact hotmelt adhesive as a whole.

9. The process of claim 1 wherein the contact hotmelt adhesive contains 20% to 50% by weight of a tackifier having a softening range of 10° C. to 150° C. and 5% to 25% by weight of a plasticizer, wherein the contact hotmelt adhesive has an initial strength of at least 1 MPa, a Shore A hardness at room temperature below 65 and a glass transition temperature in the range of −10° C. to +30° C.

10. A process of bonding comprising applying a contact hotmelt adhesive as a melt to each surface to be joined permitting the applied hotmelt adhesive to solidify, fitting the coated surfaces together with pressure without heating wherein the contact hotmelt adhesive comprises:

a) NCO-terminated polyester polyurethane prepolymer, b) a tackifier having a softening range of 40° C. to 150° C. and optionally c) a plasticizer, the contact hotmelt adhesive having an open time of at least 10 minutes, wherein the NCO-terminated polyester polyurethane prepolymer does not crystallize during the open time.

11. The process as claimed in claim 10 wherein said melt is cooled to room temperature over a period of 8 minutes after said applying and before said fitting.

12. The process of claim 10 wherein the tackifier in the contact hotmelt adhesive is a phenolic-modified coumarone/indene resin having a softening range of 55° C. to 105° C.

13. The process of claim 10 wherein the contact hotmelt adhesive contains from 1% to 50% by weight of the tackifier, based on the contact hotmelt adhesive as a whole.

14. The process of claim 10 wherein the contact hotmelt adhesive contains from 5% to 30% by weight of the tackifier, based on the contact hotmelt adhesive as a whole.

15. The process of claim 10 wherein the contact hotmelt adhesive contains up to 25% by weight of the plasticizer, based on the contact hotmelt adhesive as a whole.

16. The process of claim 10 wherein the contact hotmelt adhesive contains from 1% to 10% by weight of the plasticizer, based on the contact hotmelt adhesive as a whole.

17. The process of claim 10 wherein the contact hotmelt adhesive has an initial strength of at least 1 MPa.

18. The process of claim 10 wherein the contact hotmelt adhesive has a Shore A hardness at room temperature below 65 and a glass transition temperature between −10° C. to +30° C.

* * * * *